US006788337B1

United States Patent
Fujii

(10) Patent No.: US 6,788,337 B1
(45) Date of Patent: Sep. 7, 2004

(54) TELEVISION VOICE CONTROL SYSTEM CAPABLE OF OBTAINING LIVELY VOICE MATCHING WITH A TELEVISION SCENE

(75) Inventor: Koujyu Fujii, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/260,151

(22) Filed: Mar. 1, 1999

(30) Foreign Application Priority Data

Mar. 2, 1998 (JP) ............................................ 10-049352

(51) Int. Cl.[7] .......................... H04N 5/225; H04N 7/14; H04N 5/232
(52) U.S. Cl. ............................. 348/207.99; 348/14.08; 348/211.12
(58) Field of Search .................................... 348/211.12

(56) References Cited

U.S. PATENT DOCUMENTS

| 4,961,211 A | * | 10/1990 | Tsugane et al. .......... 348/14.08 |
| 5,335,011 A | * | 8/1994 | Addeo et al. ............. 348/14.1 |
| 5,625,697 A | * | 4/1997 | Bowen et al. ................ 381/92 |
| 5,686,957 A | * | 11/1997 | Baker ..................... 348/211.12 |
| 5,778,082 A | * | 7/1998 | Chu et al. ................ 348/14.07 |
| 5,940,118 A | * | 8/1999 | Van Schyndel .......... 348/14.08 |
| 5,959,667 A | * | 9/1999 | Maeng ................... 348/211.99 |
| 6,275,258 B1 | * | 8/2001 | Chim ..................... 348/211.12 |

FOREIGN PATENT DOCUMENTS

| JP | 351015 | 12/1994 | ............ H04N/7/15 |
| JP | 205278 | 8/1996 | ............ H04R/3/00 |
| JP | 223551 | 8/1996 | ............ H04N/7/15 |

* cited by examiner

*Primary Examiner*—Andrew Christensen
*Assistant Examiner*—Tia M. Harris
(74) *Attorney, Agent, or Firm*—Michael Best & Friedrich LLP

(57) ABSTRACT

In a television voice control system which controls voices obtained through a plurality of microphones (14a to 14n) coincidentally with an image pick up by a television camera (11) to be displayed as a scene on a screen, the television voice control system has a calculating unit 12 and a microphone control unit 13 which adjust and control the voices obtained through a plurality of microphones (14a to 14n) by interlocking an image pick up condition of the television camera (11) so that the voices be adapted to the scene.

7 Claims, 3 Drawing Sheets

TELEVISION VOICE CONTROL SYSTEM CAPABLE OF OBTAINING LIVELY VOICE MATCHING WITH A TELEVISION SCENE

BACKGROUND OF THE INVENTION

The present invention relates to a TV(television) voice control system, and more particularly to a television voice control system which adjusts voices collected by a plurality of microphones with correspondence to television scenes.

Nowadays, various sports games are relayed over a television network and popular among many people. They can watch the sports games through television scenes relayed by the television network without going to sports stadiums in which the sports games are held. This enables them to watch the sports games with the feeling of being at a live performance although they are at home, and so on.

Thus, it becomes possible to readily watch the sports game, and the like by pictures on a television screen. However, the pictures on the television screen are sometimes incongruous with voices coming from television speakers. Such incongruity between the pictures and the voices is caused to occur on the ground that pictures taken by television cameras are not correlated with voices collected by microphones provided separately from the television cameras. Namely, as the television cameras are operated by professional camera crews, an object is selected and taken a picture thereof from far or near according to circumstances of the game. On the contrary, a microphone is fixed at a predetermined position only to collect voices coming into an area where the voices are capable of being inputted to the microphone. As a result, microphone operators must keep up with changes of camerawork to select a necessary one of the microphones.

Some proposals have been made, as prior arts, to collate the television camera and the microphone with each other.

An example is exemplified, as a first prior art, in unexamined Japanese Patent Publication Hei 06-351015, namely 351015/1994. An image pick up apparatus for television conference system disclosed therein as the first prior art detects directions information in which a voice is generated based on a voice information produced by a speaker. In view of the direction information, a condition picking up an image is controlled by the image pick up apparatus. Thereby, an image pick up direction, a picture angle, and a voice collecting direction can be automatically varied at real-time. In addition, cost is reduced in the image pick up apparatus accordingly.

Another example is exemplified, as a second prior art, in unexamined Japanese Patent Publication Hei 08-205278, namely 205278/1996. An automatic mixing apparatus disclosed therein as the second prior art effectively utilizes irregularly generated detection signals such as, sensor detection signals, and the like, as timing signals for mixing control to mix a plurality of voice signals automatically. Accordingly, mixing with high quality can be done without fail for effective voices generated in such a sports game as progressed at a high speed. Further, the mixing of effective voices matched with television scenes can be effectively carried out.

Still another example is exemplified, as a third prior art, in unexamined Japanese Patent Publication Hei 08-223551, namely 223551/1996. A television conference system disclosed therein as the third prior art has a detection unit for detecting a direction of the highest sensitivity. In the television conference system, a microphone is turned to the direction of the highest sensitivity detected by the detection unit while a video camera follows the direction to pick up an image of a conferee. Thereby, a speaker among conferees who speak alternately is traced one by one, then a voice and an image of the speaker are automatically inputted to the television conference system. As a result, by a fewer number of microphones and video cameras than the number of the conferees, a speaker who speaks unexpectedly is detected. A voice and an image of the detected speaker can be sent correctly.

However, in the above-mentioned first, second and third prior arts, it is not achieved that any voice can be selected from voices obtained through a microphone fixed at a predetermined position on the condition that an object to be taken picture thereof by a television camera is changed according to circumstances of the game.

SUMMARY OF THE INVENTION

It is therefore an object of the present invention to provide a television voice control system, in which a desirable voice can be selected from voices obtained through a microphone fixed at a predetermined position, thereby capable of obtaining lively voice corresponding to a television scene provided by a television camera which moves to follow the change of the object to be taken picture thereof.

Other objects of the present invention will become clear as the description proceeds.

According to an aspect of the present invention, there is provided a television voice control system comprising: a television camera for picking up an image on an image pick up condition so that said image be displayed as a scene on a screen; at least two microphones for collecting voices, respectively; and interlocking control means which adjust and controls said voices obtained through said at least two microphones by interlocking said image pick up condition of said television camera so that said voices be adapted to said scene.

The interlocking control means may further comprise: position calculating means for determining an image pick up position of said television camera by an input of an image information from said television camera; and microphone control means which select at least one microphone corresponding to said image pick up position from said at least two microphones in response to an image pick up position information from said position calculating means and which adjust and mix said voice obtained by the selected at least one microphone.

The television camera may further comprise: direction detecting means for detecting an image pick up direction; range detecting means for detecting an image pick up range; and distance detecting means for detecting an image pick up distance.

The position calculating means may further comprise camera location data for indicating location of said television camera; said position calculating means determining said image pick up position based on said camera location data.

The microphone control means may further comprise microphone location data for indicating location of each of said at least two microphones; said microphone control means determining said at least one microphone corresponding to said image pick up position based on said microphone location data.

The microphones may further comprise movable members, respectively, by which the respective microphone

DETAILED DESCRIPTION OF THE PREFERRED EMBODIMENTS

Figure 1:
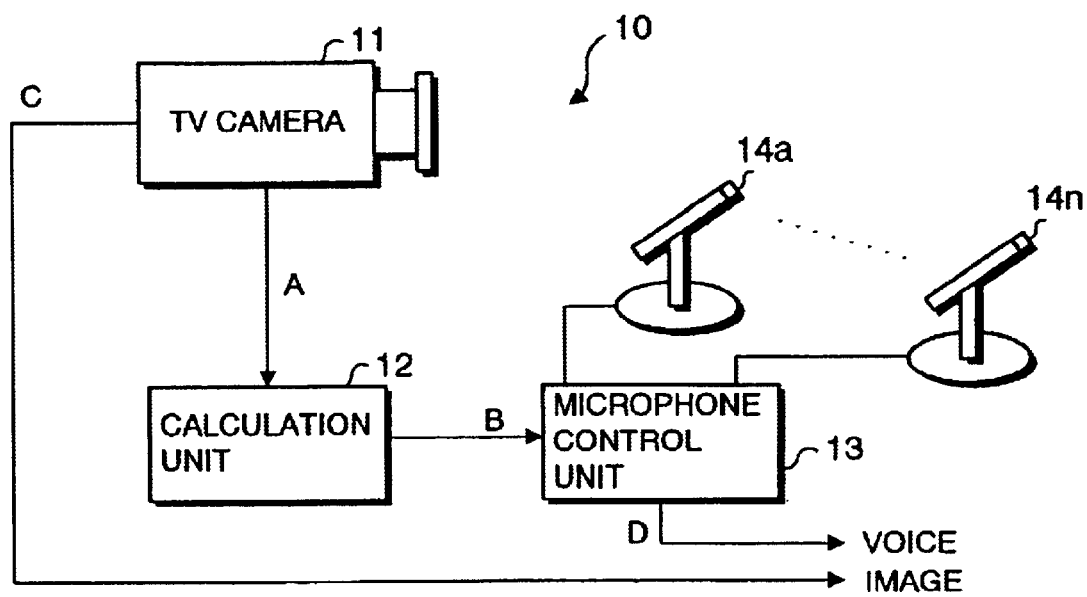
FIG. 1 is a block diagram for schematically showing a structure of a television voice control system according to a first embodiment of the present invention.

Referring now to FIGS. 1 through 4, description will proceed to a television voice control system according to a first embodiment of the present invention. FIG. 1 is a block diagram for schematically showing a structure of a television voice control system according to a first embodiment of the present invention.

As illustrated in FIG. 1, a television voice control system 10 comprises a television camera 11 which is a picture input unit, a calculation unit 12 as position calculating means to which an image information A is inputted from the television camera 11, and a microphone control unit 13 as a microphone control means to which a screen position data B is inputted from the calculation unit 12. A plurality of microphones 14a to 14n are connected to the microphone control unit 13. Each of the microphones 14a to 14n is located on a respective position in an image pick up field by the television camera 11.

Figure 2:
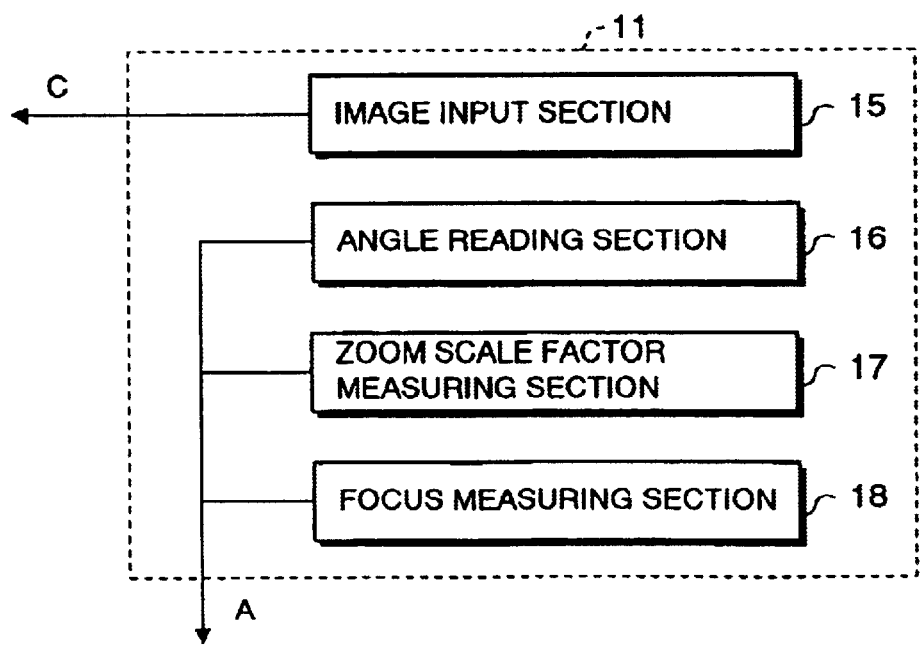
FIG. 2 is a block diagram for schematically showing a structure of a television camera illustrated in FIG. 1.

Referring to FIG. 2 with reference to FIG. 1 continued, description is made about the television camera 11 in detail. FIG. 2 is a block diagram for schematically showing a structure of the television camera 11 illustrated in FIG. 1.

As illustrated in FIG. 2, the television camera 11 comprises a picture input section 15, an angle reading section 16, a zoom scale factor measuring section 17, and a focus measuring section 18.

In FIG. 2, the picture input section 15 picks up an image of an object through an image pick up lens (not shown), and so no to input a picture information which will be shown on the television screen. The angle reading section 16 reads a direction of the television camera 11 supported upward by a tripod, and the like by the use of angles of the television camera 11 with respect to three axes, X-Y-Z, respectively. The angle reading section 16 thereby outputs a direction information that indicates the direction of the television camera 11. The zoom scale factor measuring section 17 measures a zoom scale factor of the image pick up lens (not shown) to output a range information of the object in which the television camera 11 is picking up the image thereof. The focus measuring section 18 measures an adjusting position of focal length of the image pick up lens (not shown) to output a distance information which indicates a distance between the television camera 11 and the object.

In the above-mentioned information, the picture information C is outputted to a picture input portion of a television set (not shown). On the other hand, the direction information, the range information and the distance information are, as an image information A, outputted to the calculation unit 12, as depicted in FIG. 1.

Figure 3:
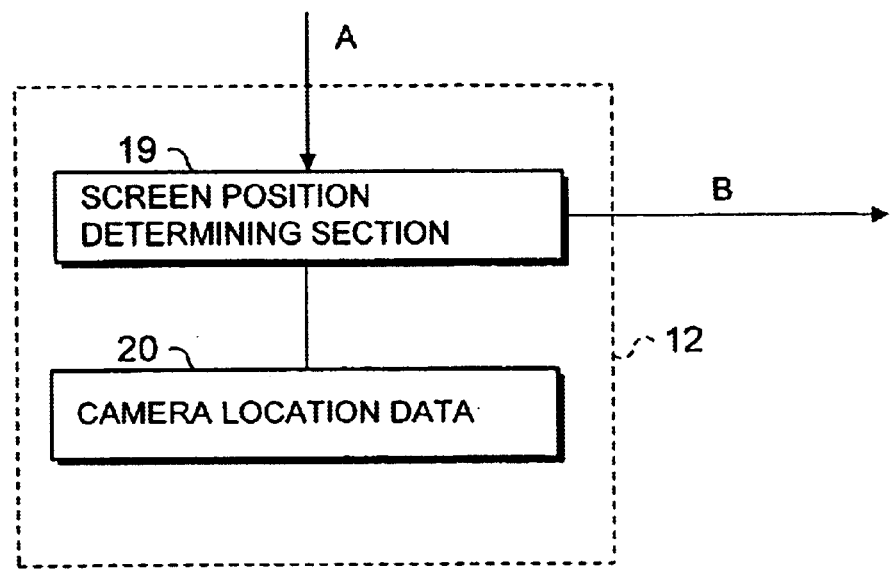
FIG. 3 is a block diagram for schematically showing a structure of a calculation unit illustrated in FIG. 1; for showing a first example in the present invention.

Referring to FIG. 3 with reference to FIG. 1 continued, description is made as regards the calculation unit 12 illustrated in FIG. 1. FIG. 3 is a block diagram for schematically showing a structure of the calculation unit 12.

As illustrated in FIG. 3, the calculation unit 12 comprises a screen position determining section 19 and camera location data 20. The camera location data 20 are positioning data that show the location of the television camera 11. On the other hand, the screen position determining section 19 acquires a position of the object in which the television camera 11 are picking up the image thereof with reference to the camera location data 20 based on inputted image information A. In other words, the screen position determining section 19 acquires screen position data (position information of picking up image) B which indicates the position of the object which is now displayed in the television set (not shown). The screen position data (position information of picking up image) B is outputted to the microphone control unit 13 illustrated in FIG. 1.

Figure 4:
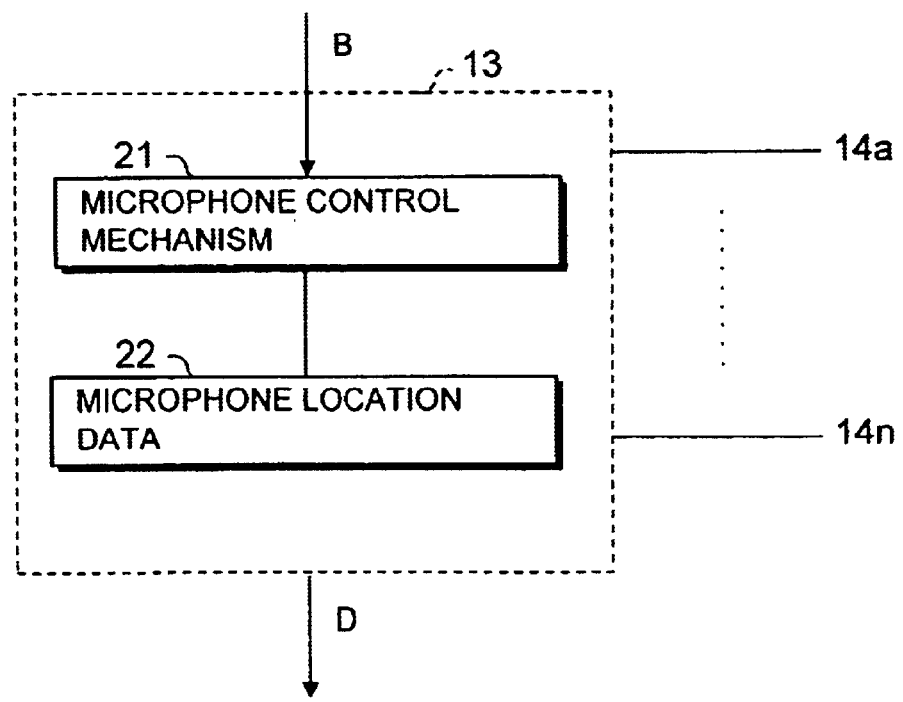
FIG. 4 is a block diagram for schematically showing a structure of a microphone control unit illustrated in FIG. 1.

Referring to FIG. 4 with reference to FIG. 1 continued, description is made about the microphone control unit 13 illustrated in FIG. 1. FIG. 4 is a block diagram for schematically showing a structure of the microphone control unit 13.

As illustrated in FIG. 4, the microphone control unit 13 comprises a microphone control mechanism 21 and microphone location data 22. The microphone location data 22 are positioning data that show each location of each microphone 14a to 14n. On the other hand, the microphone control mechanism 21 calculates which microphones should be selected to supply a voice and how strong the voice of the selected microphone should be provided.

As the result of the calculation, the microphone control mechanism 21 determines one or more microphones among the microphones 14a to 14n and selects voices from the determined microphone and mix or adjust the selected voices to be outputted as a voice information D so that the voices be adapted to a scene displayed on the television screen just now. The mixing and adjusting the voices include not only mixing of plenty of voices but also an adjustment of volume and directivity of the voices. In addition, unnecessary voices from microphones located on positions relationless to the scene are also abolished by the microphone control mechanism 21.

As will be understood from the description mentioned above, the calculation unit 12 and the microphone control unit 13 function as interlocking control means which interlock image picking up condition of the television camera 11 and which adjust and controls voices obtained from a plurality of microphones 14a to 14n to be adapted to the scene.

Next, referring to FIGS. 1 through 4 continued, description will proceed to a voice output by the television voice control system 10.

For example, in a case of a relay of a sports game held on a ground, such as soccer or the like, the television camera 11 takes a picture of a certain part of the ground coincidentally with motions of soccer players. In this case, the image information A for determining where the certain part of the picture is on the ground is outputted from the television camera 11 to the calculation unit 12.

The calculation unit 12 refers screen position determining section 19 based on the image information A and the camera location data 20 to determine a part and a range of the ground to which the scene on the screen is corresponding. Thus, the calculation unit 12 outputs the screen position data B. Generally, a plurality of television cameras 11 are used in a relay of a sports game. Accordingly, when ID (Identification code) is attached with every television cameras 11 to be included in the camera location data 20, it is readily possible to determine which part of the ground is displayed and which camera is taking a picture thereof.

In the microphone control unit 13 to which the screen position data B is inputted, one or more microphones located corresponding to the part of the ground just displayed in the screen are determined by microphone location data 22. Herein, the microphone location data 22 indicate where a plurality of microphones 14a to 14n are located on the ground for obtaining voices generated in various portions of the ground. When the above-mentioned correspondingly located one or more microphones are determined, the microphone control mechanism 21 adjusts and controls voices collected by the corresponding microphones and, if necessary, the other microphones therearound by mixing, adjustment of volume and directivity of voice, and abolishment of unnecessary voices.

As a result, the voice information D can be outputted from the microphone control unit 13, as voices optimized for the scene just displayed. Thus, watchers of the sports game by televisions can obtain the feeling of the live performance, when compared with their conventional experiences. Further, voices adapted to the scene can be automatically obtained coincidentally with motions of the scenes without switching the microphones 14a to 14n from one to another by hand and so on.

Figure 5:
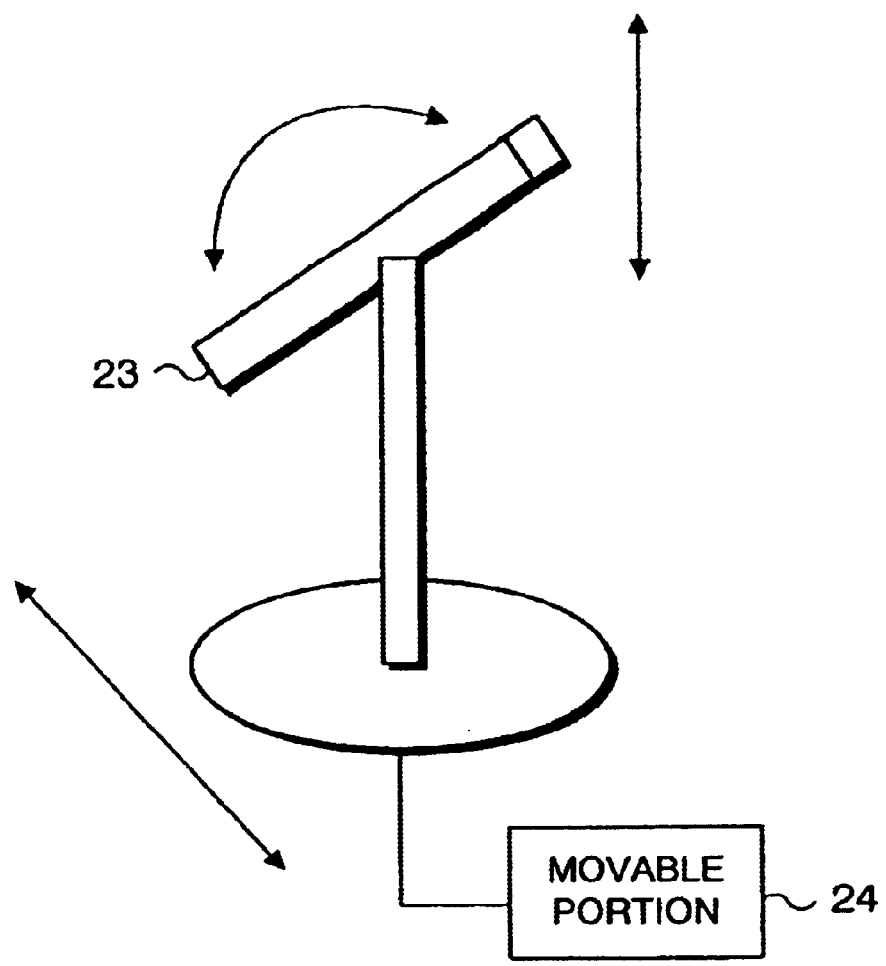
FIG. 5 is a schematic view for explaining a microphone according to a second embodiment of the present invention.

Referring now to FIG. 5, description will proceed to a television voice control system according to a second embodiment of the present invention. FIG. 5 is a schematic view for explaining a structure of a television voice control system according to the second embodiment of the present invention.

As illustrated in FIG. 5, a microphone 23 comprises a movable portion 24 which enables the microphone 23 to expand a range for collecting voices. Through the movable portion 24, it becomes possible to move or rotate the microphone 23 in upper or lower and right hand or left hand directions. Consequently, it is possible to control a position and a direction of the microphone 23 more delicately. Therefore, a voice further adapted to the scene can be obtained by the movable portion 24. The movable portion 24 is controlled by the microphone control unit 13 based on the inputted picture information C.

As described above, in the first and the second embodiments, the screen position data B is made based on the image information A which includes various data, such as a position and a range for the presently displayed scene. By the screen position data B, the voices inputted through a plurality of microphones 14a to 14n can be adjusted and controlled to be optimized voices adapted to the presently displayed scene. Accordingly, any microphones suitable for the image picking up condition are selected from a plurality of microphones 14a to 14n fixed on predetermined positions, respectively. In addition, when necessary, voices obtained from the selected microphones are further adjusted. Thereby, the television voice control system according to the embodiments can provide a lively voice corresponding to a television scene provided by a television camera which moves to follow the change of the object to be taken picture thereof.

What is claimed is:

1. A television voice control system comprising:

a television camera for picking up an image positioned on a portion of an image pick up field, the camera comprising a detecting section and an output for outputting image information measured by said detecting section, said image information further comprising a camera identification code, and image pick up condition information, the image displayed as a scene on a screen;

at least two microphones fixed at predetermined positions about the image pick up field for collecting voices, respectively; and interlocking control means which mixes and adjusts said voices collected through one or more of the said at least two microphones according to the image information so that said mixed and adjusted voices be adapted to said scene.

2. A television voice control system as claimed in claim 1, wherein said interlocking control means comprises:

position calculating means for determining the position of the image with reference to television camera location data; and microphone control means which select at least one microphone corresponding to said determined position of the image from said at least two microphones.

3. A television voice control system as claimed in claim 2, wherein said television camera detection section further comprises:

a direction detecting means for outputting angles of the camera with respect to three axes, the angles indicative of the camera direction for the image pick up condition;

a range detecting means for outputting an image pick up range for the image pick up condition; and a distance detecting means for outputting a distance between the camera and an object within the image for the image pick up condition.

4. A television voice control system as claimed in claim 2, wherein said camera location data further comprises the camera identification code.

5. A television voice control system as claimed in claim 3, wherein said microphone control means further comprises microphone location data for indicating location of each of said at least two microphones; said microphone control means selecting said at least one microphone corresponding to said image position based on a comparison of said microphone location data with said image position.

6. A television voice control system as claimed in claim 5, wherein said microphones further comprise moveable members, respectively by which the respective microphone can be moved or rotated in upper or lower and right hand or left hand directions.

7. The television voice control system of claim 1 further comprising a plurality of cameras positioned about the image pick up field at a plurality of locations, each camera of the plurality comprising a unique identification code, the interlocking control means receiving the identification code to determine which camera of the plurality is picking up the image positioned on a portion of the image pick up field.

* * * * *